United States Patent
Rezvani et al.

(10) Patent No.: US 11,258,071 B2
(45) Date of Patent: Feb. 22, 2022

(54) OXIDATION OF WATER USING LAYERED DOUBLE HYDROXIDE CATALYSTS

(71) Applicants: Zolfaghar Rezvani, Tabriz (IR); Leila Jafari Foruzin, Ardabil (IR); Biuck Habibi, Tabriz (IR)

(72) Inventors: Zolfaghar Rezvani, Tabriz (IR); Leila Jafari Foruzin, Ardabil (IR); Biuck Habibi, Tabriz (IR)

(73) Assignee: Azarbaijan Shahid Madani University, Tabriz (IR)

( * ) Notice: Subject to any disclaimer, the term of this patent is extended or adjusted under 35 U.S.C. 154(b) by 235 days.

(21) Appl. No.: 16/373,962

(22) Filed: Apr. 3, 2019

(65) Prior Publication Data
US 2019/0229344 A1 Jul. 25, 2019

Related U.S. Application Data (60) Provisional application No. 62/652,327, filed on Apr. 4, 2018.

(51) Int. Cl.
*H01M 4/86* (2006.01)
*C25B 1/04* (2021.01)
(Continued)

(52) U.S. Cl.
CPC ............ *H01M 4/8657* (2013.01); *C25B 1/04* (2013.01); *C25B 11/031* (2021.01);
(Continued)

(58) Field of Classification Search
CPC ............ H01M 4/8657; H01M 4/8605; H01M 4/9016; C25B 1/04; C25B 11/035; C25B 11/14
See application file for complete search history.

(56) References Cited

U.S. PATENT DOCUMENTS

2015/0141666 A1* 5/2015 Chen ............... H01M 4/96
549/12
2015/0368811 A1* 12/2015 Gray ............... C25B 11/0484
205/630

FOREIGN PATENT DOCUMENTS

CN 105177618 A * 12/2015 ............ Y02E 60/36

OTHER PUBLICATIONS

Xu et al ("Room-temperature synthetic NiFe layered double hydroxide with different anions intercalation as an excellent oxygen evolution catalyst", RSC Adv. (2015), 5, 55131-55135) (Year: 2015).*

(Continued)

*Primary Examiner* — Sheng H Davis
*Assistant Examiner* — Michael Forrest
(74) *Attorney, Agent, or Firm* — Bajwa IP Law Firm; Haris Zaheer Bajwa (57) ABSTRACT

A method for oxidizing water including fabricating a working electrode using an electrocatalyst, preparing an electrochemical cell by putting the working electrode, a counter electrode, and a reference electrode in an electrolyte, and performing an oxygen evolution reaction (OER) by applying an electrical potential between the working electrode and the counter electrode. The electrocatalyst includes a nickel-calcium-iron layered double hydroxide (NiCaFe-LDH) nanoparticle, the NiCaFe-LDH nanoparticle has a formula of $[Fe_x)NiCa_{(1-x)}](OH)_2(NO_3)_x \cdot nH_2O$, where: $0.2 \leq x \leq 0.4$ and $0 \leq n \leq 2.5$.

12 Claims, 10 Drawing Sheets

(51) Int. Cl.
*H01M 4/90* (2006.01)
*C25B 11/031* (2021.01)
*C25B 11/044* (2021.01)

(52) U.S. Cl.
CPC ......... *C25B 11/044* (2021.01); *H01M 4/8605* (2013.01); *H01M 4/9016* (2013.01)

(56) References Cited

OTHER PUBLICATIONS

Qiao et al ("One-step synthesis of zinc-cobalt layered double hydroxide (Zn—Co-LDH) nanosheets for high efficiency oxygen evolution reaction". J. Mater. Chem. A. (2015), 3, 6878). (Year: 2015).*
Shimaa et al (Catalytic Activity toward Oxygen Evolution of LaFeO3 Prepared by Microwave Assisted Citrate method, J Electrochem Soc, 159, (2012), F600-F605). (Year: 2012).*
Minguzzi et al ("Dynamic potential-pH diagrams application to electrocatalysts for water oxidation" Chem. Sci. (2012) 3, 217-229) (Year: 2012).*
Feng et al (A Highly Active CoFe Layered Double Hydroxide for Water Splitting, Chempluschem. (2017), 82, 483-488) and in further view of Shimaa. (Year: 2017).*
Sanosh et al ("Utilization of biowaste eggshells to synthesize nanocrystalline hydroxyapatite powders." Mater. Lett. 63. (2009) 2100-2102) (Year: 2009).*
Madram et al ("Application of Pd-Substituted Ni—Al layered double hydroxides for the hydrogen evolution reaction", Iranian J Hyd Fuel Cell 4(2015) 253-261) (Year: 2015).*

\* cited by examiner

OXIDATION OF WATER USING LAYERED DOUBLE HYDROXIDE CATALYSTS

CROSS-REFERENCE TO RELATED APPLICATION

This application claims the benefit of priority from U.S. Provisional Patent Application Ser. No. 62/652,327, filed on Apr. 4, 2018, and entitled "SYNTHESIS OF THREE CATIONIC LAYERED DOUBLE HYDROXIDE BY USING EGG SHELL FOR WATER OXIDATION (HYDROGEN AND OXYGEN GENERATION)," which is incorporated herein by reference in its entirety.

TECHNICAL FIELD

The present disclosure generally relates to a method for oxidation of water, particularly, to a method for oxidation of water using layered double hydroxide (LDH) catalysts, and more particularly, to a three cationic LDH catalyst for oxidation of water.

BACKGROUND

The increasing demands for clean energy due to problems such as depletion and pollution of fossil fuels have attracted intense research interests on alternative energy sources with minimum environmental impact. In this connection, electrolysis of water into hydrogen and oxygen may be considered a practical strategy to store electricity generated from renewable energy sources such as solar and wind. Electrochemical water oxidation has been considered as one of the important approaches to produce hydrogen fuels on a large scale on a cathode while an oxygen evolution reaction (OER) is taking place on an anode. However, kinetics of the OER is slow and consequently affects hydrogen evolution reaction (HER) on the cathode.

In order to enhance the electrochemical water oxidation, an electrocatalyst may be needed to overcome a slow kinetics of the OER which generally requires a large amount of overpotential to generate hydrogen at an acceptable rate. Although conventional noble metal-based electrocatalysts are generally used in water oxidation reactions, their industrial applications may be limited due to their scarcity, high cost, and low energy conversion efficiency. Extensive efforts have been made to overcome these problems of the conventional noble metal-based electrocatalysts by developing non-precious OER catalysts with high efficiency. First-row transition metals, such as nickel (Ni) and iron (Fe) show comparable performances in electrochemical energy systems and significantly lower costs compared with precious metals, such as iridium (Ir) and ruthenium (Ru). Also, layered double hydroxides (LDHs) composed of layers of divalent and trivalent metal cations coordinated to hydroxide anions have been widely used as electrocatalysts for water oxidation because of their unique physical and chemical properties.

While, LDH of different first-row transition metals such as NiFe-LDHs have been studied as suitable electrocatalysts for water oxidation and oxygen evolution reactions (OERs), many challenges remain in the development of an industrially viable electrocatalyst, most notably the cost of rapid oxidation of water. Generally, water oxidation is carried out at excessive pH which results in corrosion difficulties which decrease stability and increases costs. Therefore, there is a need for a fast and cost-effective electrocatalyst for oxidation of water with high efficiency. Also, there is a need for a cost-effective electrocatalyst based on inexpensive materials and/or abundant metals with high efficiency at neutral pH which enables water oxidation at potentials close to a thermodynamic limit.

SUMMARY

This summary is intended to provide an overview of the subject matter of this patent, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure describes an exemplary method for oxidizing water including fabricating a working electrode using an electrocatalyst, preparing an electrochemical cell by putting the working electrode, a counter electrode, and a reference electrode in an electrolyte, and performing an oxygen evolution reaction (OER) by applying an electrical potential between the working electrode and the counter electrode of the electrochemical cell. In an exemplary embodiment, the electrocatalyst may include an exemplary nickel-calcium-iron layered double hydroxide (NiCaFe-LDH) nanoparticle. In an exemplary embodiment, the exemplary NiCaFe-LDH nanoparticle may have a formula of $[Fe_x(NiCa)_{1-x}](OH)_2 (NO_3)_x \cdot nH_2O$, where: $0.2 \leq x \leq 0.4$ and $0 \leq n \leq 2.5$. In an exemplary embodiment, the exemplary NiCaFe-LDH nanoparticle may have a particle size between about 5 nm and about 90 nm. In an exemplary embodiment, the exemplary NiCaFe-LDH nanoparticle may have a porous structure with a surface area between about 50 $m^2g^{-1}$ and about 200 $m^2g^{-1}$.

In an exemplary embodiment, applying the electrical potential between the working electrode and the counter electrode may include applying an electrical potential between about 0.3 V and about 1.4 V versus saturated calomel electrode (SCE) to the working electrode. In an exemplary embodiment, performing the oxygen evolution reaction (OER) may include performing the OER with an onset potential of about 0.95 V versus saturated calomel electrode (SCE) at a pH level of about 7. In an exemplary embodiment, performing the oxygen evolution reaction (OER) may include performing the OER with a Tafel slope of about 13 mV/decade at a pH level of about 7. In an exemplary embodiment, performing the oxygen evolution reaction (OER) may include performing the OER at a pH level of at least about 7.

In an exemplary embodiment, fabricating the working electrode using the exemplary electrocatalyst may include fabricating the working electrode using at least one of modifying a carbon paste electrode (CPE) with the exemplary electrocatalyst, dropping the exemplary electrocatalyst on a fluorine doped tin oxide (FTO) glass, dropping the exemplary electrocatalyst on a glassy carbon electrode, and precipitating the exemplary electrocatalyst on nickel foam. In an exemplary embodiment, fabricating the working electrode using the electrocatalyst may include modifying a carbon paste electrode (CPE) by adding the electrocatalyst to graphite with a weight ratio between about 1:3 and about 1:32. In an exemplary embodiment, modifying the carbon paste electrode (CPE) with the electrocatalyst may further include adding at least one of nujol oil, paraffin oil, and silicone oil to the graphite.

In an exemplary embodiment, preparing the electrochemical cell may include putting the working electrode and a counter electrode in sodium phosphate buffer with a concentration of at least about 0.1 M. In an exemplary embodiment, the counter electrode may include at least one of platinum (Pt), gold (Au), and graphite. In an exemplary embodiment, the reference electrode may include at least one of saturated calomel electrode (SCE), standard hydrogen electrode (SHE), and silver chloride electrode (Ag/AgCl).

In an exemplary embodiment, fabricating the working electrode may include fabricating an electrocatalyst and modifying a carbon paste electrode (CPE) with the electrocatalyst by adding the NiCaFe-LDH nanoparticles to graphite. In an exemplary embodiment, fabricating the electrocatalyst may include forming calcium ($Ca^{2+}$) ions, forming a mixture of catalyst precursors by mixing an iron salt and a nickel salt with calcium ($Ca^{2+}$) ions, precipitating the catalyst precursors by adjusting a pH level of the mixture, and synthesizing NiCaFe-LDH nanoparticles by heating the precipitated catalyst precursors up to a temperature between about 50° C. and about 120° C.

In another general aspect, the present disclosure describes an exemplary electrocatalyst for oxidizing water including an exemplary nickel-calcium-iron layered double hydroxide (NiCaFe-LDH) nanoparticle. In an exemplary embodiment, the exemplary NiCaFe-LDH nanoparticle may include divalent metal ions including $Ni^{2+}$ ions and $Ca^{2+}$ ions, and trivalent metal ions including $Fe^{3+}$ ions. In an exemplary embodiment, the exemplary NiCaFe-LDH nanoparticle may have a formula of $[Fe_x(NiCa)_{1-x}](OH)_2 (NO_3)_x \cdot nH_2O$, where: $0.2 \leq x \leq 0.4$ and $0 \leq n \leq 2.5$. In an exemplary embodiment, the exemplary NiCaFe-LDH nanoparticle may have at least one of a spherical-shaped structure, a rod-shaped structure, and a nanosheet structure. In an exemplary embodiment, the electrocatalyst may be configured to oxidize water in an oxygen evolution reaction (OER) with a Tafel slope of about 13 mV/decade at a pH level of about 7. In an exemplary embodiment, the electrocatalyst may be configured to oxidize water in an oxygen evolution reaction (OER) with an onset potential of about 0.95 V versus saturated calomel electrode (SCE) at a pH level of about 7.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

The present disclosure describes an exemplary ternary electrocatalyst based on LDH of nickel (Ni), iron (Fe), and calcium cation ($Ca^{2+}$) for oxidizing water with high efficiency. The exemplary electrocatalyst may exhibit significantly enhanced electrochemical performance at a neutral pH level compared to conventional electrocatalysts by lowering overpotential with high current density and thereby reducing the input energy cost of water oxidation. In another aspect of the present disclosure, the exemplary electrocatalyst may be used in an exemplary method for water oxidation with low onset potential and a low Tafel slope.

In an exemplary embodiment, higher efficiency may refer to efficiency in terms of high current density, low onset potential, low Tafel slope, and reduced input energy cost. In an exemplary embodiment, the exemplary electrocatalyst may include nanostructured LDH to increase a surface area of the electrocatalyst for performing OER with higher efficiency. In an exemplary embodiment, the electrocatalyst may include nickel-calcium-iron layered double hydroxide (NiCaFe-LDH) nanoparticles. In an exemplary embodiment, the NiCaFe-LDH nanoparticles may include divalent metal ions including $Ni^{2+}$ ions and $Ca^{2+}$ ions, and trivalent metal ions including $Fe^{3+}$ ions. As used herein an "electrocatalyst" may refer to a substance which promotes an electrochemical reaction without being consumed.

Figure 1A:
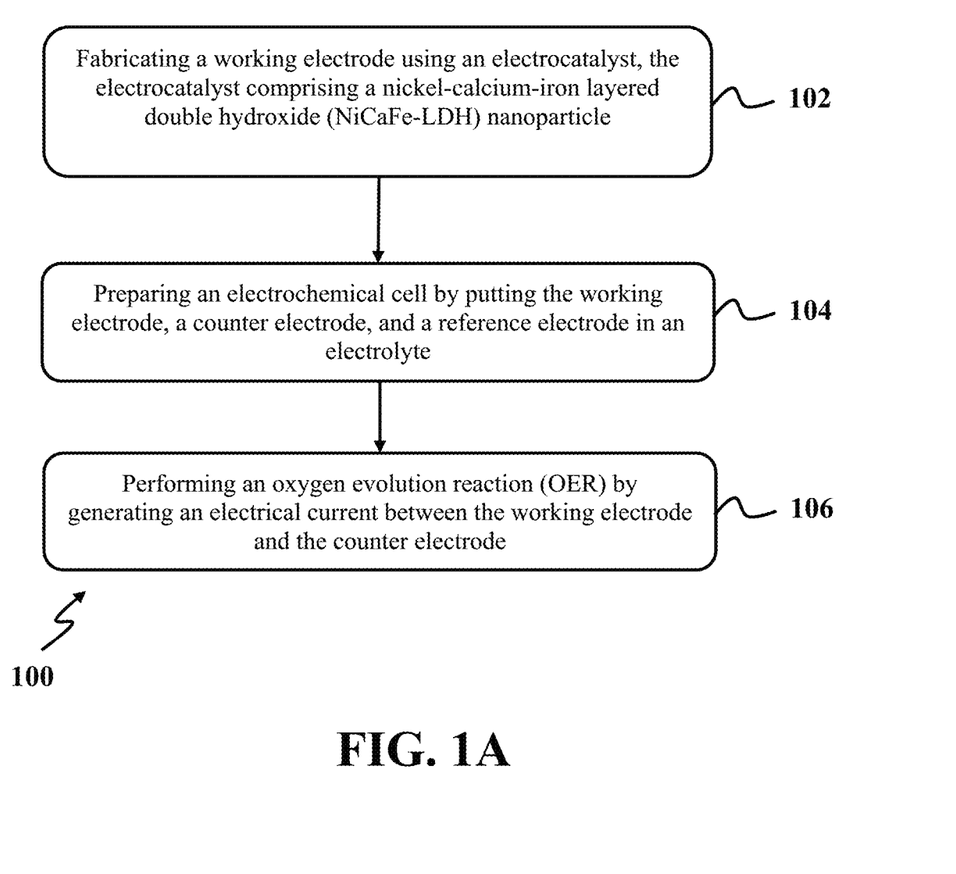
FIG. 1A illustrates an exemplary method for oxidizing water using an exemplary electrocatalyst, consistent with one or more exemplary embodiments of the present disclosure.

In exemplary embodiments of the present disclosure, an exemplary method for oxidizing water using an exemplary three cationic layered double hydroxide (LDH) nanoparticles is disclosed. FIG. 1A illustrates an exemplary method 100 for oxidizing water using an exemplary electrocatalyst, consistent with one or more exemplary embodiments of the present disclosure. Method 100 may include fabricating a working electrode using an exemplary electrocatalyst (step 102), preparing an electrochemical cell by putting the working electrode, a counter electrode, and a reference electrode in an electrolyte (step 104), and performing an oxygen evolution reaction (OER) by applying an electrical potential between the working electrode and the counter electrode of the electrochemical cell (step 106).

In further detail with respect to step 102, fabricating a working electrode using an exemplary electrocatalyst may include fabricating the working electrode using at least one of modifying the carbon paste electrode (CPE) with the exemplary electrocatalyst, dropping the exemplary electrocatalyst on a fluorine doped tin oxide (FTO) glass, dropping the exemplary electrocatalyst on a glassy carbon electrode, and precipitating the exemplary electrocatalyst on nickel foam.

Figure 1B:
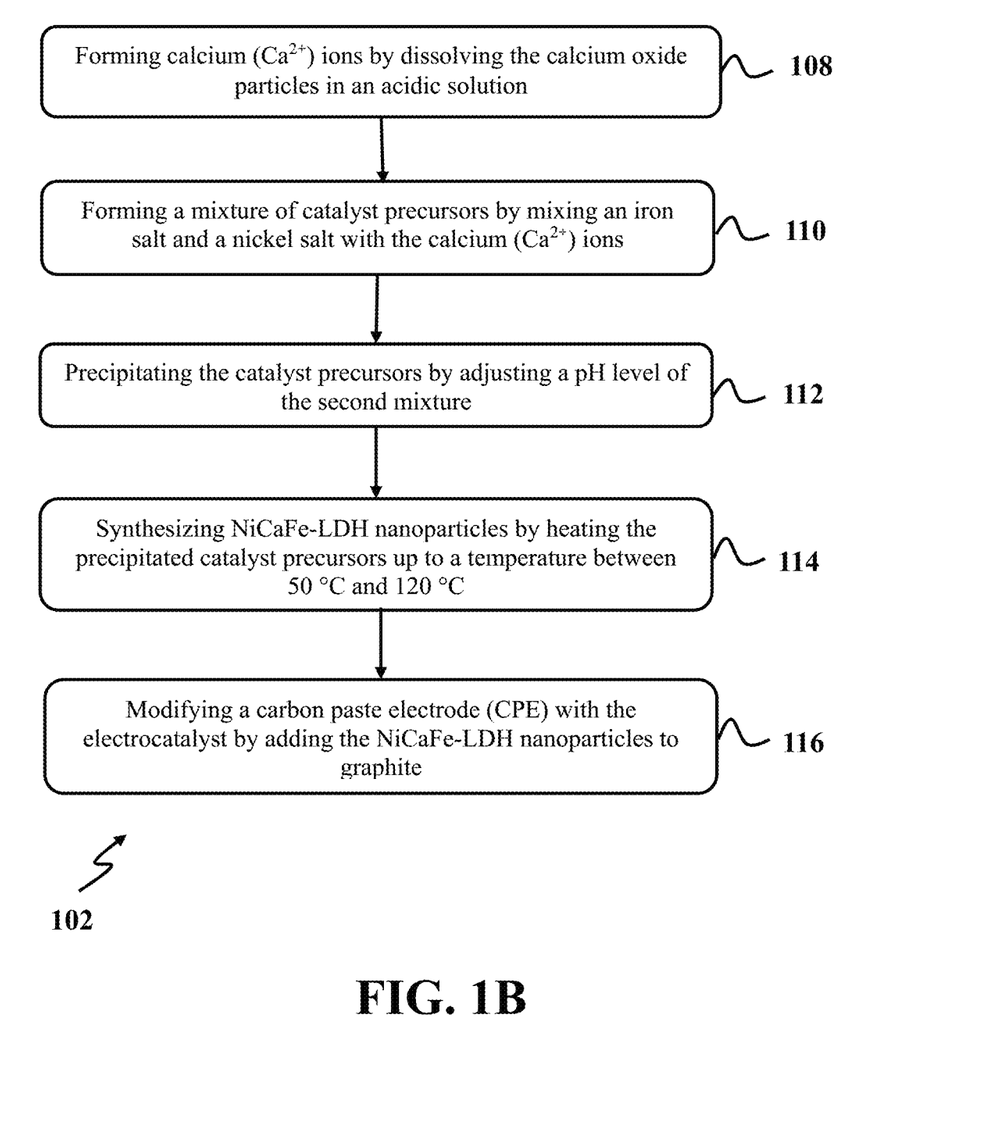
FIG. 1B illustrates an exemplary method for fabricating a working electrode by modifying a carbon paste electrode (CPE) with an exemplary electrocatalyst, consistent with one or more exemplary embodiments of the present disclosure.

FIG. 1B illustrates an exemplary method for fabricating the working electrode by modifying the carbon paste electrode (CPE) with the exemplary electrocatalyst, consistent with one or more exemplary embodiments of the present disclosure. Referring to FIG. 1B, fabricating the working electrode by modifying the carbon paste electrode (CPE) with the exemplary electrocatalyst (step 102) may include forming calcium ($Ca^{2+}$) ions by dissolving the calcium oxide particles in an acidic solution (step 108), forming a mixture of catalyst precursors by mixing an iron salt and a nickel salt with the calcium ($Ca^{2+}$) ions (step 110), synthesizing nickel-calcium-iron layered double hydroxide (NiCaFe-LDH) nanoparticles (step 112), precipitating the catalyst precursors by adjusting a pH level of the mixture (step 114), synthesizing NiCaFe-LDH nanoparticles by heating the precipitated catalyst precursors up to a temperature between 50° C. and 120° C. (step 116), and modifying a carbon paste electrode (CPE) with the electrocatalyst by adding the NiCaFe-LDH nanoparticles to graphite (step 118).

In further detail with respect to step 108, forming calcium ($Ca^{2+}$) ions may include dissolving the calcium oxide particles in the acidic solution under stirring condition. In an exemplary embodiment, the acidic solution may include nitric acid. In an exemplary embodiment, the acidic solution may have a weight concentration about 50 wt. %. In an exemplary embodiment, calcium oxide (CaO) particles may be synthesized by calcinating an eggshell. In an exemplary embodiment, calcinating the eggshell may include crushing the eggshell and heating the crushed eggshell up to a temperature between 950° C. and 990° C. for a time period of about 6 hours. In an exemplary embodiment, applying this heating for about six hours or so continues until forming of a white powder of calcium oxide (CaO)

In further detail with respect to step 110, forming a mixture of catalyst precursors by mixing the iron salt and the nickel salt with the calcium ($Ca^{2+}$) ions may include forming the mixture of catalyst precursors by mixing the iron nitrate ($Fe(NO_3)_3$) and the nickel nitrate ($Ni(NO_3)_2$) with the calcium ($Ca^{2+}$) ions. In an exemplary embodiment, mixing the iron salt and the nickel salt with the calcium ($Ca^{2+}$) ions may include mixing the iron salt and the nickel salt with the calcium ($Ca^{2+}$) ions using at least one of a homogenizer and a stirrer. In an exemplary embodiment, mixing the iron salt and the nickel salt with the calcium ($Ca^{2+}$) ions may include mixing the iron salt and the nickel salt with the calcium ($Ca^{2+}$) ions with a molar ratio of ($Ni^{2+}+Ca^{2+}$) to $Fe^{3+}$ between about 1:1 and about 4:1.

In further detail with respect to step 112, precipitating the catalyst precursors may include adjusting a pH level of the mixture to a pH level between about 9.5 and about 10.5. In an exemplary embodiment, precipitating the catalyst precursors may include adjusting the pH level of the mixture under stirring condition. In an exemplary embodiment, precipitating the catalyst precursors may include adjusting pH of the mixture by dropwise adding sodium hydroxide (NaOH) to the mixture at a temperature between about 50° C. and 120° C.

In further detail with respect to step 114, synthesizing the NiCaFe-LDH nanoparticles may include heating the precipitated catalyst precursors up to a temperature between 50° C. and 120° C. for a time period of about 24 hours. In an exemplary embodiment, synthesizing the NiCaFe-LDH nanoparticles may include heating the precipitated catalyst precursors at a temperature of about 120° C. in an autoclave for a time period of about 24 hours. In an exemplary embodiment, synthesizing the NiCaFe-LDH nanoparticles may include aging precipitated catalyst precursors by heating the precipitated catalyst precursors at a temperature of about 120° C. for a time period of about 24 hours. In an exemplary embodiment, synthesizing the NiCaFe-LDH nanoparticles may further include purifying NiCaFe-LDH nanoparticles, and drying the purified NiCaFe-LDH nanoparticles at room temperature.

Figure 2:
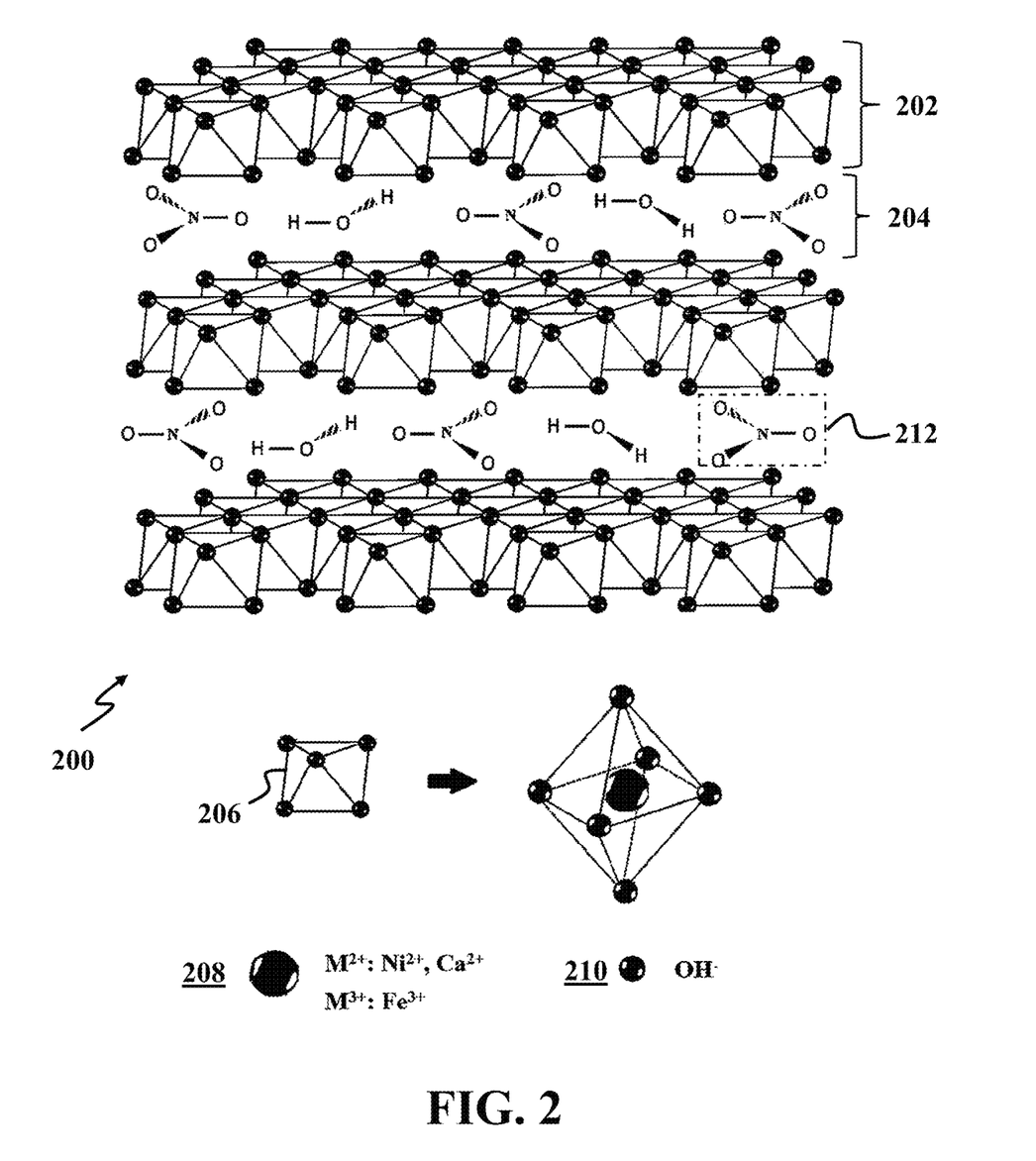
FIG. 2 illustrates a schematic representation of an exemplary NiCaFe-LDH nanoparticle, consistent with one or more exemplary embodiments of the present disclosure.

FIG. 2 illustrates a schematic of an exemplary NiCaFe-LDH nanoparticle 200, consistent with one or more exemplary embodiments of the present disclosure. Referring to FIG. 2, exemplary NiCaFe-LDH nanoparticle 200 may include a layered double hydroxide (LDH) sheet 202 and an interlayer domain 204. In an exemplary embodiment, LDH sheet 202 may include edge-shared octahedral units 206. In an exemplary embodiment, octahedral unit 206 may include a divalent ($M^{2+}$) or trivalent ($M^{3+}$) cation 208 in the center and hydroxides ($OH^-$) 210 at the corners. In an exemplary embodiment, divalent ($M^{2+}$) cation 208 may include $Ni^{2+}$ and $Ca^{2+}$, and trivalent ($M^{3+}$) cation 208 may include $Fe^{3+}$. In an exemplary embodiment, interlayer domain 204 may include $NO_3^-$ anions 212 and water ($H_2O$) molecules. In an exemplary embodiment, exemplary NiCaFe-LDH nanoparticle 200 may have a formula of $[Fe_x(NiCa)_{1-x}](OH)_2(NO_3)_x \cdot nH_2O$, where: $0.2 \leq x \leq 0.4$ and $0 \leq n \leq 2.5$.

In an exemplary embodiment, exemplary NiCaFe-LDH nanoparticle 200 may have an average particle size between about 5 nm and about 90 nm. In an exemplary embodiment, exemplary NiCaFe-LDH nanoparticle 200 may have a porous structure with a pore diameter between about 0.9 nm and about 6 nm. In an exemplary embodiment, the NiCaFe-LDH nanoparticle may have a porous structure with a surface area between about 50 $m^2 g^{-1}$ and 200 $m^2 g^{-1}$. In an exemplary embodiment, exemplary NiCaFe-LDH nanoparticle 200 may have at least one of a spherical-shaped structure, a rod-shaped structure, and a nanosheet structure.

In an exemplary embodiment, exemplary NiCaFe-LDH nanoparticle 200 may be used as an electrocatalyst to water oxidation catalysis (WOC) or an oxygen evolution reaction (OER). In an exemplary embodiment, exemplary NiCaFe- LDH nanoparticle 200 may be configured to oxidize water in an oxygen evolution reaction (OER) with a Tafel slope of about 13 mV/decade at a pH level of about 7. In an exemplary embodiment, NiCaFe-LDH nanoparticle 200 may be configured to oxidize water in an oxygen evolution reaction (OER) with an onset potential of about 0.95 V versus saturated calomel electrode (SCE) at a pH level of about 7.

In further detail with respect to step 116, modifying the carbon paste electrode (CPE) with the electrocatalyst may include mixing the exemplary NiCaFe-LDH nanoparticles with graphite. In an exemplary embodiment, modifying the CPE with the electrocatalyst may include adding the electrocatalyst to graphite with a weight ratio between about 1:3 and about 1:32. In an exemplary embodiment, modifying the CPE with the electrocatalyst may further include adding at least one of nujol oil, paraffin oil, and silicone oil as a binder to the graphite.

Referring back to FIG. 1A, in further detail with respect to step 104, preparing the electrochemical cell may include putting the working electrode, a counter electrode, and a reference electrode in an electrolyte with a pH level of at least about 7. In an exemplary embodiment, preparing the electrochemical cell may include putting the working electrode, the counter electrode, and the reference electrode in a neutral electrolyte. In an exemplary embodiment, the neutral electrolyte may include sodium phosphate buffer with a concentration of at least about 0.1 M. In an exemplary embodiment, the counter electrode may include at least one of platinum (Pt), gold (Au), and graphite. In an exemplary embodiment, the reference electrode may include at least one of saturated calomel electrode (SCE), standard hydrogen electrode (SHE), and silver chloride electrode (Ag/AgCl).

In further detail with respect to step 106, performing the oxygen evolution reaction (OER) may include applying an electrical potential between the working electrode and the counter electrode between about 0.3 V and about 1.4 V versus saturated calomel electrode (SCE) to the working electrode. In an exemplary embodiment, the working electrode may be used as an anode and the counter electrode may be used as a cathode. In an exemplary embodiment, electrolyzing water may be initiated after applying the electrical potential.

In an exemplary embodiment, oxygen gas may be produced at a surface of a working electrode and hydrogen gas may be produced at a surface of a counter electrode. In an exemplary embodiment, performing OER may include performing the OER with an onset potential of about 0.95 V versus saturated calomel electrode (SCE) at a pH level of about 7. In an exemplary embodiment, performing the OER may include performing the OER with a Tafel slope of about 13 mV/decade at a pH level of about 7. In an exemplary embodiment, performing the OER may include performing the OER at a pH level of at least about 7.

EXAMPLES

Example 1: Synthesis of the Exemplary Electrocatalyst

Figure 3A:
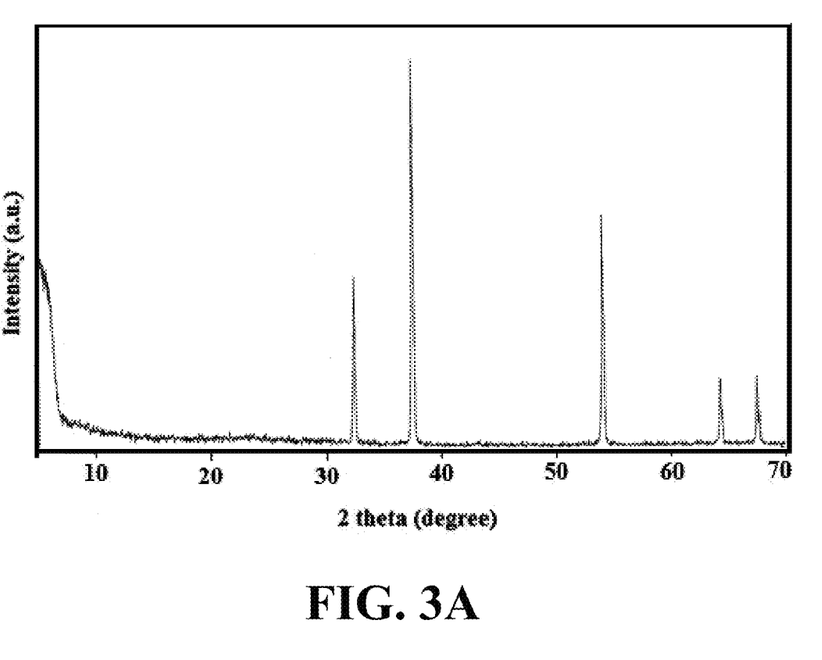
FIG. 3A illustrates an X-ray diffraction (XRD) spectrum of an eggshell after calcination, consistent with one or more exemplary embodiments of the present disclosure.

In this example, exemplary NiCaFe-LDH nanoparticles as the exemplary electrocatalyst were synthesized using an exemplary hydrothermal method and an exemplary co-precipitation method. At first, calcium oxide (CaO) particles were synthesized by calcinating an eggshell. The eggshell was washed with water, dried at room temperature, and crushed with a mortar. After that, crushed eggshell was calcinated at a temperature between about 950° C. and 990° C. for a time period of about 6 hours until obtaining a white powder of calcium oxide. FIG. 3A illustrates an X-ray diffraction (XRD) spectrum of an eggshell after calcination, consistent with one or more exemplary embodiments of the present disclosure. Referring to FIG. 3A, the presence of peaks at a 2θ degree of 32, 37.5, 54, 64.5, and 67.5 indicate XRD pattern of calcium oxide and formation of calcium oxide (CaO) particles after calcination.

In order to synthesize the exemplary NiCaFe-LDH nanoparticles in an exemplary hydrothermal method, calcium ions ($Ca^{2+}$) were produced by dissolving about 0.017 g (0.015 mol) of calcium oxide in a balloon containing 3 mL of nitric acid and 1 mL of water. After that, a mixture of catalyst precursors was formed by adding about 0.16 gr (0.02 mol) iron nitrate nonahydrate ($Fe(NO_3)_3.9H_2O$), about 0.15 g (0.025 mol) nickel nitrate hexahydrate ($Ni(NO_3)_2.6H_2O$) to the produced calcium ($Ca^{2+}$) ions. Therefore, the mixture included metal ions of nickel (Ni2+) ions, iron ($Fe^{2+}$) ions, and about 0.015 mol of the calcium ($Ca^{2+}$) ions with a molar ratio of ($Ni^{2+}+Ca^{2+}$) to $Fe^{3+}$ of about 2:1. Then, the mixture was mixed using a stirrer until a clear solution was obtained.

In the next step, the catalyst precursors were precipitated by adjusting a pH level of the mixture to 10.5 by dropwise addition of 2.0 M of NaOH at a temperature of about 80° C. under a continuous stirring condition. After that, exemplary NiCaFe-LDH nanoparticles were synthesized by aging the precipitates for a time period of about 24 hours in an autoclave reactor at a temperature of about 120° C. followed by centrifuging at a speed of about 2000 round per minute (rpm) for a time period of about 20 minutes. In the end, synthesized NiCaFe-LDH nanoparticles were washed with double distilled water and then dried at room temperature overnight. All reactions were carried out under the nitrogen atmosphere. In this example, the synthesized NiCaFe-LDH nanoparticles had a formula of $[Fe_{0.33} Ni_{0.42} Ca_{0.25}](OH)_2 (NO_3)_{0.33} \cdot 2.3H_2O$.

Also, in order to synthesize NiCaFe-LDH nanoparticles in a co-precipitation method, after precipitating the catalyst precursors, the NiCaFe-LDH nanoparticles were synthesized by aging the precipitates at a temperature between about 50° C. and about 70° C. overnight, followed by centrifuging at a speed of about 2000 round per minute (rpm) for a time period of about 20 minutes. In the end, synthesized NiCaFe-LDH nanoparticles were washed with double distilled water and then dried at room temperature overnight. All reactions were carried out in nitrogen atmosphere.

Furthermore, double cationic NiFe-LDH nanoparticles were synthesized using an exemplary hydrothermal method. In a balloon containing 20 mL of water, about 0.16 gr (0.02 mol) iron nitrate nonahydrate ($Fe(NO_3)_3.9H_2O$) and 0.24 gr (0.04 mol) nickel nitrate hexahydrate ($Ni(NO_3)_2.6H_2O$) were completely dissolved. Then, $Ni^{2+}$ ions, $Fe^{3+}$ ions, and $NO_3^-$ ions as precursors of the double cationic NiFe-LDH nanoparticles were precipitated by adjusting the pH level of the reaction to 10.5 through dropwise addition of NaOH with a concentration of about 2.0 M at a temperature of about 80° C. under continuous stirring condition. After that, the precipitates were aged at an autoclave reactor for 24 hours followed by centrifuging at a speed of about 2000 rpm for a time period of about 20 minutes. The synthesized NiFe-LDH nanoparticles were then washed with double distilled water and dried at the room temperature overnight. All reactions were carried out in nitrogen atmosphere.

Figure 3B:
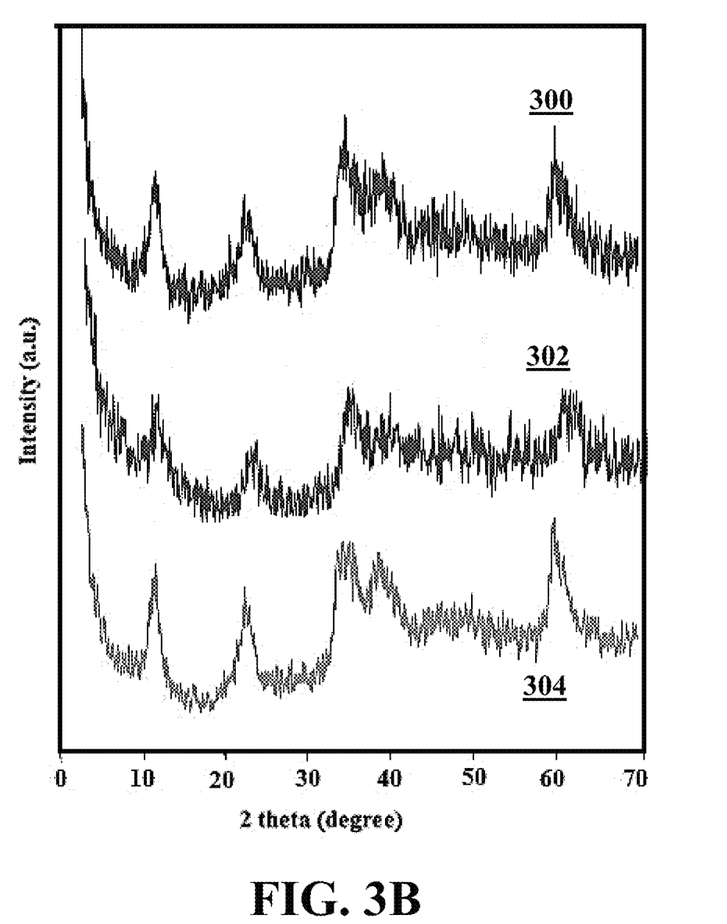
FIG. 3B illustrates an X-ray diffraction (XRD) spectrum of exemplary NiCaFe-LDH nanoparticles synthesized in a hydrothermal method, exemplary NiCaFe-LDH nanoparticles synthesized in a co-precipitation method, and exemplary NiFe-LDH nanoparticles synthesized in a hydrothermal method, consistent with one or more exemplary embodiments of the present disclosure.

Afterward, the synthesized nanoparticles were characterized by x-ray diffraction analysis. FIG. 3B illustrates an X-ray diffraction (XRD) spectrum 300 of NiCaFe-LDH nanoparticles synthesized in a hydrothermal method, an spectrum 302 of NiCaFe-LDH nanoparticles synthesized in a co-precipitation method, and an spectrum 304 of NiFe-LDH nanoparticles synthesized in a hydrothermal method, consistent with one or more exemplary embodiments of the present disclosure. Referring to FIG. 3B, all spectra include three peaks appeared in 2θ degree of 11.56, 22.56, and 34.56, which confirm the formation of the layered double hydroxide (LDH). According to spectrum 300 of the exemplary NiCaFe-LDH nanoparticles and spectrum 304 of the NiFe-LDH nanoparticles, the cell parameter "a" has a length of 3.1° A and the cell parameter "c" has a length of 23.34° A in NiCaFe-LDH nanoparticles. However, length of the cell parameters "a" and "c" are 3.09 and 22.95° A, respectively, in the NiFe-LDH nanoparticles. Therefore, the exemplary NiCaFe-LDH nanoparticles show "a" and "c" cell parameters with higher lengths. While ionic radius of $Ca^{2+}$ ions is larger than the ionic radius of $Ni^{2+}$ ions, it may be concluded that the presence of $Ca^{2+}$ ion instead of $Ni^{2+}$ in some parts of the LDH may increase the lengths of "a" and "c" cells. Therefore, XRD spectrum 300 of the exemplary NiCaFe-LDH nanoparticles confirms the presence of $Ca^{2+}$ ions in their structure.

Moreover, the exemplary NiCaFe-LDH nanoparticles has a similar crystalline structure to the NiFe-LDH nanoparticles which indicates that replacing $Ni^{2+}$ in some sites with $Ca^{2+}$ does not cause any structure deformation of NiFe-LDH. Furthermore, comparing the XRD spectrum 300 of NiCaFe-LDH nanoparticles synthesized in the hydrothermal method with the XRD spectrum 302 of NiCaFe-LDH nanoparticles synthesized in the co-precipitation method shows that the crystallinity of the exemplary NiCaFe-LDH nanoparticles synthesized in the hydrothermal method may be better than that of the exemplary NiCaFe-LDH nanoparticles synthesized in the co-precipitation method, because XRD peaks of the NiCaFe-LDH nanoparticles synthesized in the hydrothermal method are sharper and have higher intensities.

Example 2: Characterization of the Exemplary Electrocatalyst

Figure 4:
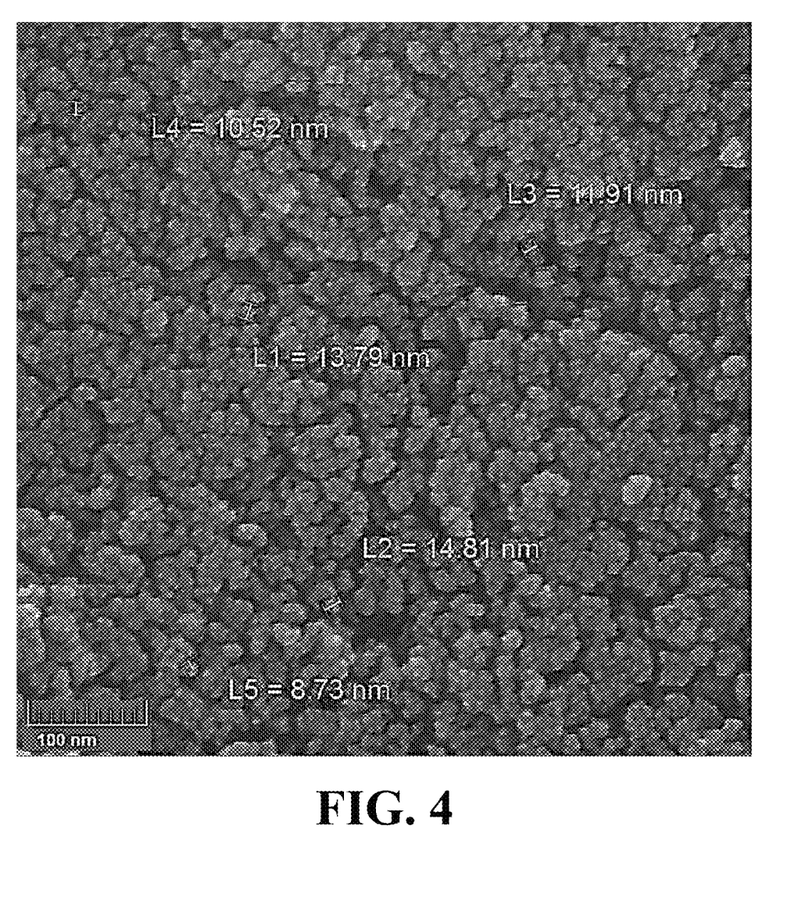
FIG. 4 illustrates a scanning electron microscopy (SEM) image of exemplary NiCaFe-LDH nanoparticles synthesized in a hydrothermal method, consistent with one or more exemplary embodiments of the present disclosure.

In this example, the exemplary NiCaFe-LDH nanoparticles of EXAMPLE 1 were characterized using scanning electron microscopy (SEM), elemental mapping analysis, and physical adsorption assay (BET analysis). FIG. 4 illustrates a scanning electron microscopy (SEM) image of the exemplary NiCaFe-LDH nanoparticles synthesized in a hydrothermal method, consistent with one or more exemplary embodiments of the present disclosure. Referring to FIG. 4, the synthesized NiCaFe-LDH nanoparticles have a spherical morphology with a particle size between 8 nm and 14 nm.

Figure 5:
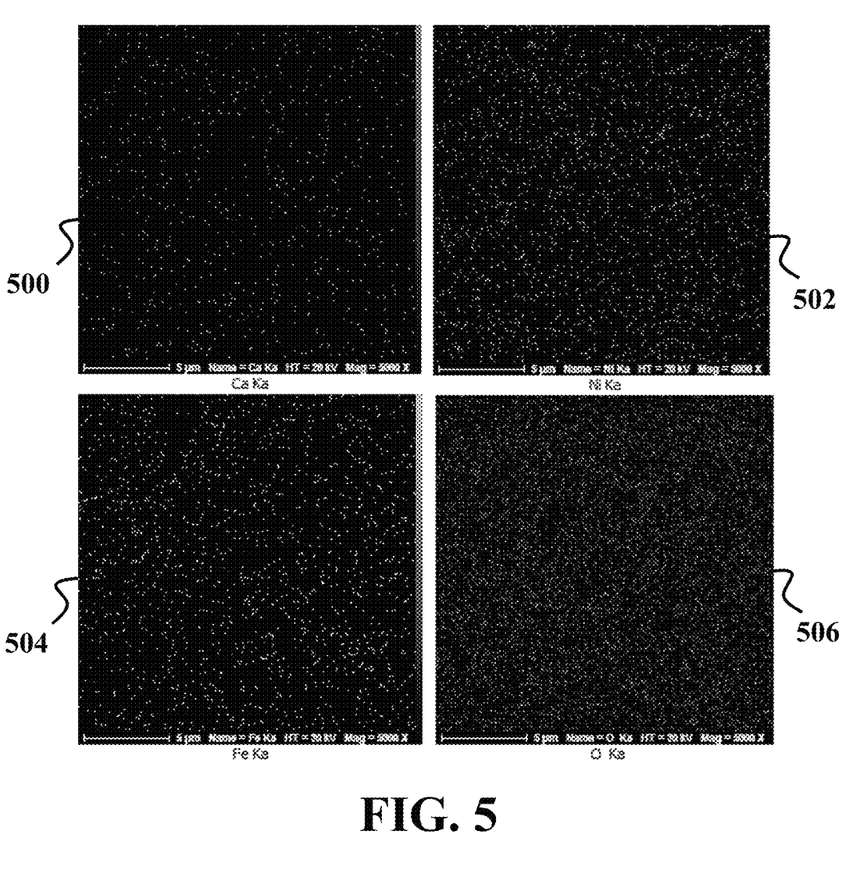
FIG. 5 illustrates an elemental mapping image of the exemplary NiCaFe-LDH nanoparticles synthesized in a hydrothermal method, consistent with one or more exemplary embodiments of the present disclosure.

FIG. 5 illustrates an elemental mapping image of the exemplary NiCaFe-LDH nanoparticles synthesized in a hydrothermal method, consistent with one or more exemplary embodiments of the present disclosure. Referring to FIG. 5, elemental mapping analysis confirms the existence of calcium 500, nickel 502, and iron 504 in the structure of the exemplary NiCaFe-LDH nanoparticles. Moreover, there is no accumulation of the elements in the elemental mapping image. Therefore, calcium 500, nickel 502, and iron 504 are homogeneously distributed throughout the NiCaFe-LDH nanoparticles.

TABLE 1 represents adsorption-desorption nitrogen isotherms data of the NiCaFe-LDH nanoparticles synthesized in the co-precipitation and hydrothermal methods.

| Sample | Synthesis method | BET ($m^2\ g^{-1}$) | Vp ($cm^3\ g^{-1}$) |
|---|---|---|---|
| NiCaFe-LDH | Hydrothermal | 139.48 | 0.190 |
| NiCaFe-LDH | Co-precipitation | 54.30 | 0.032 |

Referring to TABLE 1, the exemplary NiCaFe-LDH nanoparticles synthesized in the hydrothermal method have a higher surface area and volume pore (Vp) in comparison with the NiCaFe-LDH nanoparticles synthesized in the co-precipitation method. Also, both groups of the NiCaFe-LDH nanoparticles synthesized in the hydrothermal and co-precipitation method have an average pore diameter of about 5.3 nm and 3.0 nm, respectively. As a result, the NiCaFe-LDH nanoparticles synthesized in the hydrothermal method show higher catalytic activity due to their higher surface area and volume pore (Vp). Therefore, the exemplary hydrothermal method may lead to better NiCaFe-LDH nanoparticles than the co-precipitation method in terms of a surface area, volume pore (Vp), and a catalytic activity.

Example 3: Oxidation of Water Using the Exemplary Electrocatalyst

In this example, the exemplary NiCaFe-LDH nanoparticles synthesized in EXAMPLE 1 were used as the exemplary electrocatalyst for oxidizing water. At first, a working electrode was produced by modifying a carbon paste electrode (CPE) with the NiCaFe-LDH nanoparticles. In order to produce modified CPE, about 0.06 g of the NiCaFe-LDH nanoparticles, about 0.22 g of graphite powder, and about 1 or 2 drops of paraffin oil were mixed with mortar to obtain a homogeneous wet paste. After that, the homogeneous wet paste of the electrocatalyst was firmly packed into a cavity of a glass or a plastic tube. The same approach was used for the preparation of unmodified CPE. Also, surfaces of all the modified and unmodified CPEs were smoothed on weighing paper prior to each measurement and then rinsed with double distilled water.

In the next step, an electrochemical cell was prepared by putting modified CPE as the working electrode, platinum (Pt) as a counter electrode, and saturated calomel electrode (SCE) as a reference electrode in a neutral electrolyte. In order to prepare the electrolyte, a phosphoric acid solution with a concentration of about 0.1 M was prepared and a pH level of the solution was adjusted at a pH level of 7 using a NaOH solution with a concentration of about 1 M.

In the end, an oxygen evolution reaction (OER) was performed by applying an electrical potential between the working electrode and the counter electrode. The working electrode was used as an anode and the counter electrode was used as a cathode. Then, the electrical potential between about 0.5 and about 1.3 V was applied between the working and counter electrodes. After applying the electrical potential, oxygen gas was produced at the surface of the working electrode as the anode and hydrogen gas was produced at a surface of the counter electrode upon oxidation of water.

Figure 6A:
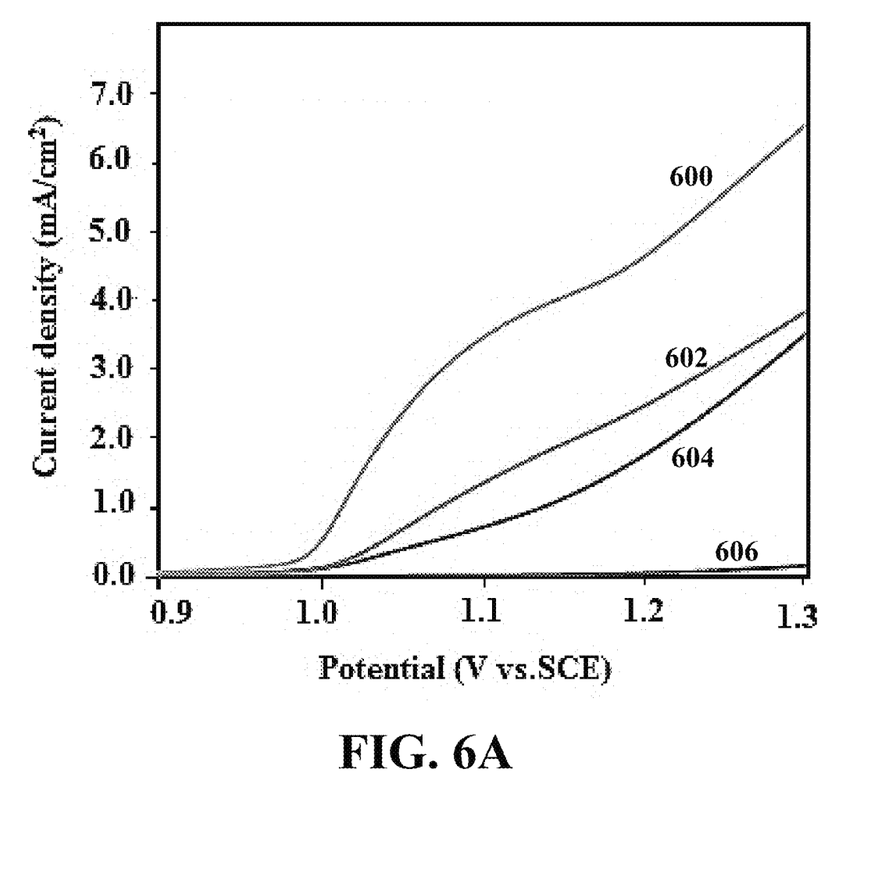
FIG. 6A illustrates linear sweep voltammetry (LSV) curves of carbon paste electrode (CPE) and CPEs modified with different exemplary NiCaFe-LDH and NiFe-LDH nanoparticles in a phosphate buffer solution at a pH level of 7.0, consistent with one or more exemplary embodiments of the present disclosure.

FIG. 6A illustrates linear sweep voltammetry (LSV) curves of a CPE modified with NiCaFe-LDH nanoparticles synthesized in a hydrothermal method 600, a CPE modified with NiCaFe-LDH nanoparticles synthesized in a co-precipitation method 602, NiFe-LDH nanoparticles 604, and unmodified carbon paste electrode (CPE) 606 in a phosphate buffer solution at a pH level of 7.0 at a scan rate of 50 mV/s, consistent with one or more exemplary embodiments of the present disclosure. Referring to FIG. 6A, the onset potential of the NiCaFe-LDH nanoparticles synthesized in the hydrothermal method 600 for water oxidation is about 0.95 V versus SCE. The onset potential for NiCaFe-LDH nanoparticles synthesized in the co-precipitation method 602 is about 1.025 V versus SCE. Also, the onset potential for the NiFe-LDH nanoparticles 604 is about 1.1 V versus SCE.

Additionally, the current density for the NiCaFe-LDH nanoparticles synthesized in the hydrothermal method 600 at a voltage of about 1.1 V is 3.6 mA, whereas the current density for the NiFe-LDH nanoparticles and the NiCaFe-LDH nanoparticles synthesized in the co-precipitation method 602 is about 0.9 mA and 1.4 mA, respectively. Therefore, a lower onset potential and a higher current density of NiCaFe-LDH nanoparticles synthesized in the hydrothermal method confirms that this electrocatalyst may oxidize water better than NiFe-LDH nanoparticles and NiCaFe-LDH nanoparticles synthesized in the co-precipitation method due to higher rate of electron transfer and lower required energy.

Figure 6B:
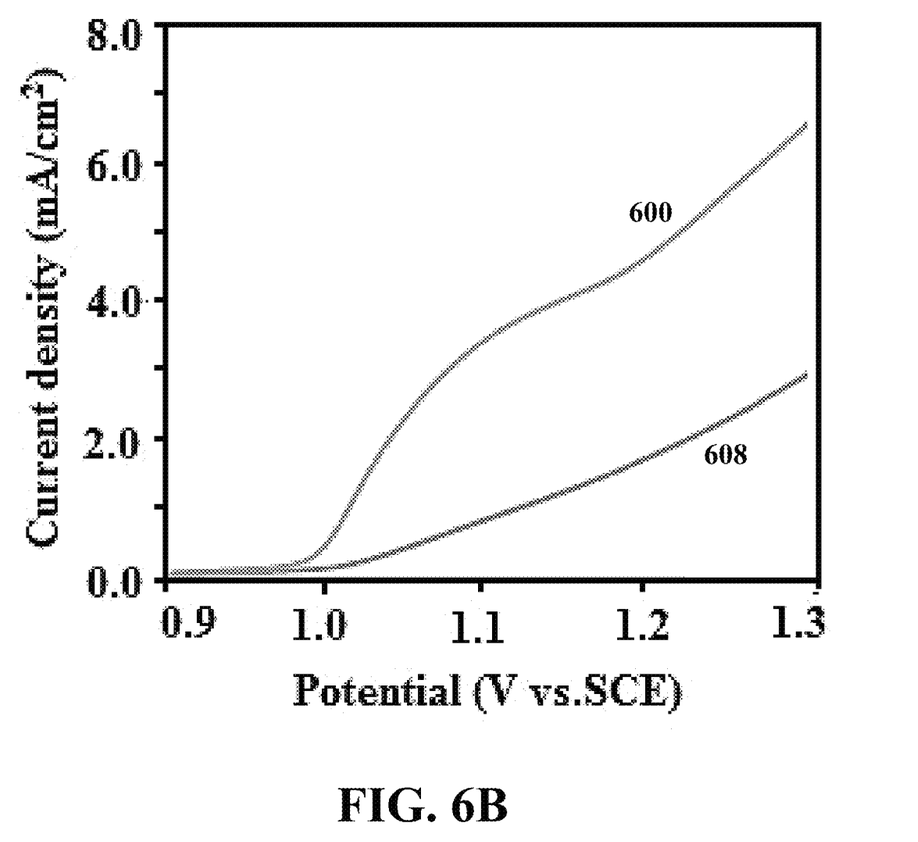
FIG. 6B illustrates linear sweep voltammetry (LSV) curves of carbon paste electrode (CPE) modified with exemplary NiCaFe-LDH and NiFe-LDH/CaO nanoparticles in a phosphate buffer solution at a pH level of 7.0, consistent with one or more exemplary embodiments of the present disclosure.

FIG. 6B illustrates linear sweep voltammetry (LSV) curves of carbon paste electrode (CPE) modified with NiCaFe-LDH nanoparticles 600 and NiFe-LDH/CaO nanoparticles 608 in a phosphate buffer solution at a pH level of 7.0 at a scan rate of 50 mV/s, consistent with one or more exemplary embodiments of the present disclosure. Referring to FIG. 6B, the comparison between the LSV curves of the CPE modified with NiCaFe-LDH nanoparticles 600 and NiFe-LDH/CaO nanoparticles 608 indicates that the NiCaFe-LDH nanoparticles have a lower onset potential and a higher current density than the NiFe-LDH/CaO nanoparticles. Therefore, the presence of $Ca^{2+}$ ions improves the conditions of water oxidation in comparison with the presence of calcium oxide particles. As a result, calcium should be present in the form of ions in the structure of the NiCaFe-LDH nanoparticles, not in the form of oxide particles to enhance the condition of water oxidation by reducing the onset potential and increasing the current density.

Figure 7:
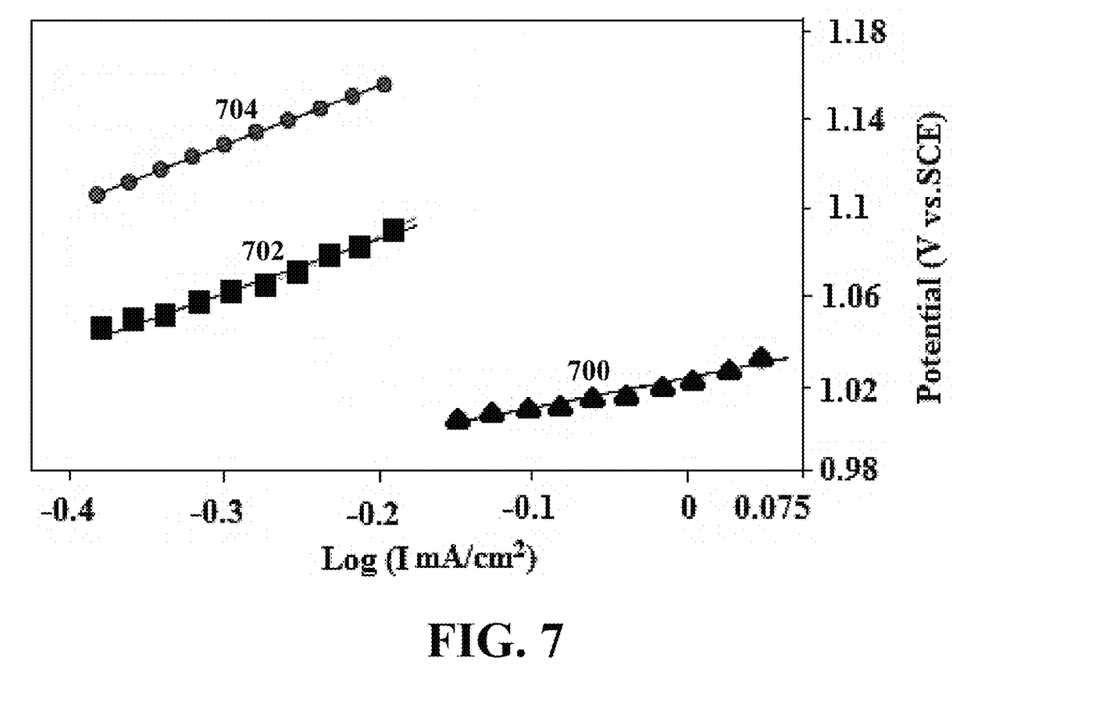
FIG. 7 illustrates Tafel plots of different oxygen evolution reactions (OERs) on carbon paste electrodes (CPEs) modified with different exemplary NiCaFe-LDH and NiFe-LDH nanoparticles, consistent with one or more exemplary embodiments of the present disclosure.

FIG. 7 illustrates Tafel plots of different oxygen evolution reactions (OERs) on a carbon paste electrode (CPE) modified with the NiCaFe-LDH synthesized in a hydrothermal method 700, a CPE modified with the NiCaFe-LDH synthesized in a co-precipitation method 702, and a CPE modified with the NiFe-LDH nanoparticles 704, consistent with one or more exemplary embodiments of the present disclosure. Referring to FIG. 7, the CPE modified with the NiCaFe-LDH synthesized in a hydrothermal method 700 has a Tafel slope of about 13 mV/dec. The CPE modified with the NiCaFe-LDH synthesized in a co-precipitation method 702 has a Tafel slope of about 25 mV/dec, and the CPE modified with the NiFe-LDH nanoparticles 704 has a Tafel slope of about 27 mV/dec. Therefore, the CPE modified with the NiCaFe-LDH synthesized in the hydrothermal method 700 has a lower Tafel slope, a higher rate of electron transfer, and significantly better performance than the CPE modified with the NiCaFe-LDH synthesized in the co-precipitation method 702 and the CPE modified with the NiFe-LDH nanoparticles under the same conditions and the same applied potential.

Referring again to FIGS. 6A, 6B, and 7, the exemplary NiCaFe-LDH nanoparticles synthesized in the hydrothermal method show lower onset potential, higher current density, and lower Tafel slope than NiFe-LDH nanoparticles and NiCaFe-LDH nanoparticles synthesized in the co-precipitation method for oxidation of water in a neutral electrolyte.

It should be noted that conventional LDH nanoparticles and electrocatalysts may perform water oxidation in a basic electrolyte and show low efficiency in neutral media. However, using basic media for oxidizing water may destroy industrial facilities over time which lowers the efficiency during long time. Therefore, the exemplary NiCaFe-LDH nanoparticles may be a suitable candidate as an electrocatalyst for water oxidation in industrial applications in neutral media with high efficiency.

In an exemplary embodiment, the examples discussed above are consistent with method 100 and the details may be employed while implementing method 100.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in the light of the attached claims and their equivalents. Also, various modifications and changes may be made within the scope of the attached claims.

What is claimed is:

1. A method for oxidizing water, comprising:
   fabricating a working electrode using an electrocatalyst, the electrocatalyst comprising a nickel-calcium-iron layered double hydroxide (NiCaFe-LDH) nanoparticle, the NiCaFe-LDH nanoparticle with a formula of $[Fe_x(NiCa)_{1-x}](OH)_2(NO_3)_x \cdot nH_2O$, where: $0.2 \leq x \leq 0.4$ and $0 \leq n \leq 2.5$, fabricating the working electrode using the electrocatalyst comprising:
   fabricating the electrocatalyst, comprising:
      forming calcium ($Ca^{2+}$) ions comprising:
         synthesizing calcium oxide particles by calcinating an eggshell; and
         dissolving the calcium oxide particles in an acidic solution;
      forming a mixture of catalyst precursors by mixing an iron salt and a nickel salt with the calcium ($Ca^{2+}$) ions, the mixture comprising metal ions of nickel ($Ni^{2+}$) ions, iron ($Fe^{3+}$) ions, and the calcium ($Ca^{2+}$) ions with a molar ratio of ($Ni^{2+}$+ $Ca^{2+}$) to $Fe^{3+}$ between 1:1 and 4:1;
      precipitating the catalyst precursors by adjusting a pH level of the mixture to a pH level between 9.5 and 10.5, adjusting the pH level of the mixture comprising adding sodium hydroxide (NaOH) to the mixture under nitrogen atmosphere; and
      synthesizing NiCaFe-LDH nanoparticles by heating the precipitated catalyst precursors up to a temperature between 50° C. and 120° C.; and
   modifying a carbon paste electrode (CPE) with the electrocatalyst by adding the NiCaFe-LDH nanoparticles to graphite;
   preparing an electrochemical cell by putting the working electrode, a counter electrode, and a reference electrode in an electrolyte; and
   performing an oxygen evolution reaction (OER) in a neutral electrolyte by applying an electrical potential between the working electrode and the counter electrode of the electrochemical cell.

2. The method of claim 1, wherein performing the OER comprises performing the OER with a Tafel slope of 13 mV/decade at a pH level of 7.

3. The method of claim 1, wherein performing the OER comprises performing the OER with an onset potential of 0.95 V versus saturated calomel electrode (SCE) at a pH level of 7.

4. The method of claim 1, wherein the NiCaFe-LDH nanoparticle has a particle size between 5 nm and 90 nm.

5. The method of claim 1, wherein the NiCaFe-LDH nanoparticle has a porous structure with a surface area between 50 $m^2g^{-1}$ and 200 $m^2g^{-1}$.

6. The method of claim 1, wherein applying the electrical potential between the working electrode and the counter electrode comprises applying an electrical potential between 0.3 V and 1.4 V versus saturated calomel electrode (SCE) to the working electrode.

7. The method of claim 1, wherein performing the OER comprises performing the OER at a pH level of at least 7.

8. The method of claim 1, wherein fabricating the working electrode using the electrocatalyst comprises modifying a carbon paste electrode (CPE) with the electrocatalyst by adding the electrocatalyst to graphite with a weight ratio between 1:3 and 1:32.

9. The method of claim 8, wherein modifying the CPE with the electrocatalyst further comprises adding at least one of paraffin oil and silicone oil to the graphite.

10. The method of claim 1, wherein preparing the electrochemical cell comprises putting the working electrode, the counter electrode, and the reference electrode in sodium phosphate buffer with a concentration of at least 0.1 M.

11. The method of claim 1, wherein the counter electrode comprises at least one of platinum (Pt), gold (Au), and graphite.

12. The method of claim 1, wherein the reference electrode comprises at least one of saturated calomel electrode (SCE), standard hydrogen electrode (SHE), and silver chloride electrode (Ag/AgCl).

* * * * *